(No Model.)
H. C. HART.
HAND GRENADE FIRE EXTINGUISHER.
No. 324,024. Patented Aug. 11, 1885.
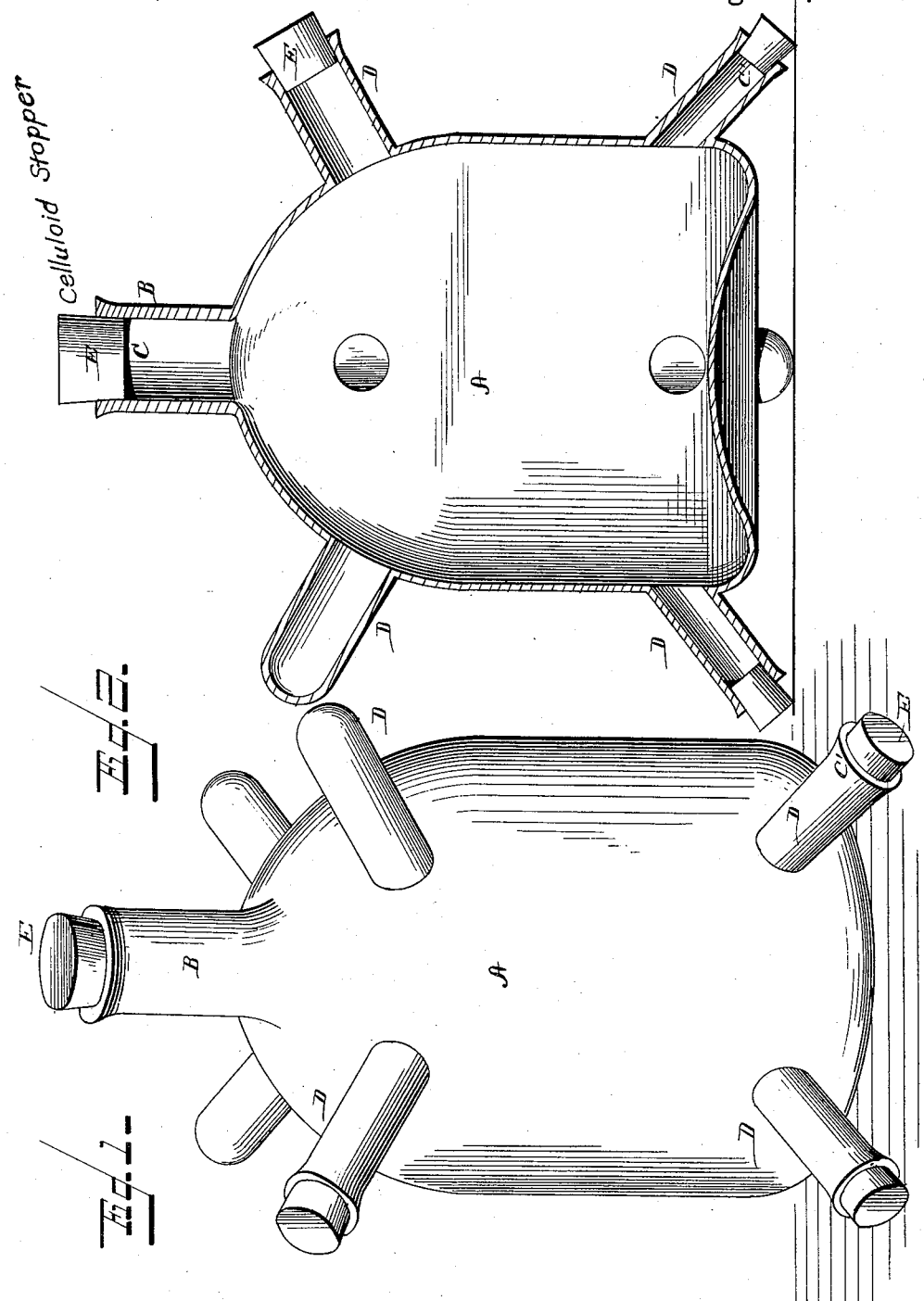

UNITED STATES PATENT OFFICE.

HUBERT C. HART, OF UNIONVILLE, CONNECTICUT.

HAND-GRENADE FIRE-EXTINGUISHER.

SPECIFICATION forming part of Letters Patent No. 324,024, dated August 11, 1885.

Application filed May 26, 1885. (No model.)

*To all whom it may concern:*

Be it known that I, HUBERT C. HART, a citizen of the United States, and a resident of Unionville, in the county of Hartford and State of Connecticut, have invented certain new and useful Improvements in Hand-Grenade Fire-Extinguishers; and I do hereby declare that the following is a full, clear, and exact description of the invention, which will enable others skilled in the art to which it appertains to make and use the same, reference being had to the accompanying drawings, which form a part of this specification, and in which—

Figure 1 is a perspective view of a hand-grenade fire-extinguisher embodying my invention. Fig. 2 is a vertical sectional view of the same.

The same letters refer to the same parts in the several figures.

This invention relates to that class of chemical fire-extinguishers which are known as "hand-grenades," and which consist of a bottle or vessel, of glass or other frangible material, containing charges of acid and alkali or other suitable substances or compounds adapted to generate carbonic-acid gas or other fire-extinguishing gases or compounds; and my invention has for its object to construct the vessel or bottle in such a manner as to render its breakage and the liberation of its contents when thrown into a fire a matter of reasonable certainty.

The invention also consists in the combination, with the bottle or vessel, of a stopper formed of some easily and rapidly combustible material, which in case the vessel should fail to break at once will be speedily consumed, and thus permit the contents of the vessel to escape.

With these ends in view the invention consists in the details of construction and arrangement of parts which will be hereinafter fully described, and particularly pointed out in the claims.

In the drawings hereto annexed, A designates the body of a bottle or vessel, formed of glass or other suitable frangible material, which is provided with a neck, B, having an opening, C, to receive a stopper.

In addition to the neck B, the vessel is provided with a series of necks or projections, D D, the ends of which may be closed, or they may have openings or mouths C' to receive stoppers. Of these projections any desired number from one and upward may be formed upon and radiating from the central body, A. Usually, however, three or more such projections will be formed upon the body A, and they will be disposed in such a manner as to form feet upon which the body may rest, substantially as will be seen in the drawings hereto annexed.

The stoppers E, which are fitted in the mouths of the necks B and D, are to be constructed of celluloid or some other suitable easily-inflammable and readily-combustible material, which in case the vessel should not break when thrown at or into a fire will be speedily consumed and enable the fire-extinguishing compound contained in the vessel to escape.

The operation of this invention will be readily understood. The vessel may be readily grasped, either by the neck proper or by any one of its projections, and hurled forcibly into the fire which it is desired to put out. The neck or one or more of the projections will in most cases be instantly broken off, thus liberating the contents; but even if this should fail, the stopper will soon be consumed and the contents of the vessel caused to escape.

I would have it understood that I do not limit myself to the precise construction of the bottle or vessel herein shown and described, but reserve to myself the right to all modifications which may be resorted to without departing from the spirit of my invention.

Having thus described my invention, I claim and desire to secure by Letters Patent of the United States—

1. In a hand-grenade fire-extinguisher, a bottle or vessel consisting of a body having an open-mouthed neck and provided with a series of radiating projections or extensions, several of which form feet or supports for the said body, and all of which form handles whereby it may be conveniently grasped or manipulated, substantially as and for the purpose set forth.

2. In a hand-grenade fire-extinguisher, the combination, with a bottle or vessel having one or more open-mouthed necks, of a stopper composed of any easily-inflammable and rapidly-combustible material which shall be capable of retaining the fire-extinguishing
5 charge safely in the vessel when not exposed to the action of fire, substantially as and for the purpose set forth.

In testimony that I claim the foregoing as my own I have hereunto affixed my signature in presence of two witnesses.

HUBERT C. HART.

Witnesses:
W. W. WOODFORD,
ROBT. M. HART.